United States Patent [19]

Burgdorf et al.

[11] Patent Number: 4,804,236

[45] Date of Patent: Feb. 14, 1989

[54] HYDRAULIC BRAKE SYSTEM WITH ANTI-SKID CONTROL AND/OR TRACTION SLIP CONTROL

[75] Inventors: Jochen Burgdorf, Offenbach-Rumpenheim; Hans-Dieter Reinartz, Frankfurt am Main; Lutz Weise, Mainz; Hans-Albert Beller, Erbach, all of Fed. Rep. of Germany

[73] Assignee: Alfred Teves GmbH, Frankfurt am Main, Fed. Rep. of Germany

[21] Appl. No.: 83,616

[22] Filed: Aug. 10, 1987

[30] Foreign Application Priority Data

Aug. 16, 1986 [DE] Fed. Rep. of Germany ....... 3627809

[51] Int. Cl.$^4$ ............ B60T 8/40; B60T 8/88; F16D 31/02
[52] U.S. Cl. ................ 303/116; 303/92; 303/10; 60/464; 60/582
[58] Field of Search ........... 60/464, 582, 586, 587; 303/2, 10, 11, 78, 80, 92, 113, 114, 115, 116, 119; 188/181 A

[56] References Cited

U.S. PATENT DOCUMENTS

| | | | |
|---|---|---|---|
| 4,025,124 | 5/1977 | Fuchs | 303/116 X |
| 4,395,073 | 7/1983 | Arikawa et al. | 303/116 |
| 4,402,554 | 9/1983 | Belart | 303/119 X |
| 4,456,309 | 1/1984 | Rath | 303/10 |
| 4,627,671 | 12/1986 | Matsui et al. | 303/116 |

FOREIGN PATENT DOCUMENTS

| | | |
|---|---|---|
| 1555600 | 4/1970 | Fed. Rep. of Germany . |
| 2345860 | 3/1975 | Fed. Rep. of Germany . |
| 2944856 | 5/1981 | Fed. Rep. of Germany ...... 303/116 |
| 3119982 | 9/1983 | Fed. Rep. of Germany . |
| 3327401 | 2/1985 | Fed. Rep. of Germany . |
| 3407539 | 5/1985 | Fed. Rep. of Germany . |
| 3438401 | 4/1986 | Fed. Rep. of Germany . |
| 3527190 | 2/1987 | Fed. Rep. of Germany . |
| 0160343 | 7/1986 | Japan .................................. 303/116 |

Primary Examiner—Andres Kashnikow
Assistant Examiner—Timothy Newholm
Attorney, Agent, or Firm—James B. Raden

[57] ABSTRACT

A hydraulic brake system with anti-skid control and/or traction slip control has a braking pressure generator (1, 21), a pressure compensation reservoir (4, 4′, 24, 24′, 42), braking pressure control valves (7, 8 $V_1$-$V_4$, $AV_1$-$AV_4$) by which pressure medium can be tapped from the wheel brakes of the controlled wheels in the braking pressure reduction phase. Further, there is provided an auxiliary pressure supply system (10, 10′) by which, in case of control, it is possible to supply pressure medium into the wheel brakes. To increase the operational reliability of the brake system, a pressure compensation chamber (18, 28, 28′, 28″, 39, 39′) with a non-return valve (19, 29, 29′, 29″, 44, 46) connected upstream and opening toward the pressure compensation chamber is inserted into the pressure medium paths from the pressure compensation reservoir (4′, 24, 24′, 42) to the auxiliary pressure supply system. The outputs of the outlet valves (AV, $AV_1$-$AV_4$, $AV_1'$-$AV_4'$) lead into said pressure compensation chamber (18, 28, 28′, 28″, 39, 39′).

10 Claims, 4 Drawing Sheets

HYDRAULIC BRAKE SYSTEM WITH ANTI-SKID CONTROL AND/OR TRACTION SLIP CONTROL

BACKGROUND OF THE INVENTION

This invention relates to a hydraulic brake system with anti-skid control and/or traction slip control for automotive vehicles. Such a brake system has a braking pressure generator with a pressure compensation reservoir and braking pressure control valves by means of which pressure medium can be tapped from the wheel brakes of the controlled vehicle wheels in the braking pressure reduction phase during slip control. It also has an auxiliary pressure supply system connected to the pressure compensation reservoir and switched on during slip control so that during slip control, pressure medium can be supplied into the wheel brakes of the controlled vehicle wheels.

A brake system of this type is described in co-pending U.S. application Ser. No. 884,195 filed July 10, 1986 now U.S. Pat. No. 4,750,788 (corresponding to W. German published patent application No. P 35 27 190). In one embodiment, the braking pressure generator comprises a tandem master cylinder with a vacuum brake booster connected upstream. It also includes an auxiliary pressure supply system which generates a pedal-force-proportional auxiliary pressure during anti-skid control and which generates an uncontrolled auxiliary pressure for traction slip control. Electromagnetic switch-over multi-directional valves connect the wheel brakes to the master cylinder in the rest position and, during control phases to the auxiliary pressure supply system. The motor of the hydraulic pump of the auxiliary pressure supply system is switched on as soon as the system's control electronics recognize, from information gathered by wheel sensors about the rotational behavior of the wheels, that there is a lock-up tendency or excessive traction slip at any one of the wheels. A ball-type seat valve is provided for controlling the auxiliary pressure. This valve is connected to a working chamber of the master cylinder to ensure that—as the braking pressure increases—the valve-induced throttling action in the pressure medium path from the delivery side to the suction side of the hydraulic pump is increased. In the traction slip control phase, a 2/2-way valve, inserted in the pressure medium's circuit, via the control valve, is changed over to lock. Thus, also in case of the master cylinder being unpressurized, the pressure medium path from the pump delivery side to the pump suction side is interrupted, thereby an uncontrolled pressure is built up. There is also provided a switch-over valve which, in case of control, connects the auxiliary pressure supply system instead of the master cylinder to the wheel brakes and also switches over the locking valves which interrupt the pressure medium path to the wheel brakes of the non-driven wheels in this phase.

In the brake system described above and in other known brake systems with anti-skid control and/or traction slip control the braking pressure is controlled in dependence on the rotational behavior of the wheels by means of the electromagnetically operable braking pressure control valves having normally closed outlet valves or outlet paths via which, in the braking pressure reduction phase, a pressure medium path or rather a pressure medium reflux is released from the wheel brakes of the controlled wheels to the braking pressure compensation reservoir of the brake system. This involves the disadvantage that in case of the outlet valves jamming in the opened position or in case of said valves leaking it will be impossible to build up any braking pressure in the appertaining wheel brake. If there is a failure of the auxiliary pressure supply system, e.g., because the pump does not start or does not deliver, it is important to prevent the outlet valves from opening so as to have a sufficient amount of pressure medium remaining in the braking pressure generator in order to provide, at least, an uncontrolled braking action without having recourse to the auxiliary pressure. Thus, a great number of measures are required for supervising the brake system or rather the pressure supply and for rapid recognition of any malfunction as well as for switching off control, completely or in part.

SUMMARY OF THE INVENTION

It is thus an object of this invention to overcome the above-mentioned problems and to increase the operational reliability of slip-controlled brake systems. It is also an object of this invention to achieve this by simple measures and by means of as little expenditure as possible.

It has been found that this object can be solved in brake systems of the type referred to above in a surprisingly simple and technically advanced manner. A pressure compensation chamber with a non-return valve connected upstream and opening toward the pressure compensation chamber is inserted into the pressure medium path from the pressure compensation reservoir to the auxiliary pressure supply system. In case of control, the pressure medium flowing off the wheel brakes can be introduced into the pressure compensation chamber.

In case of trouble in the auxiliary pressure supply system and/or in case of leaking or faulty actuation of outlet valves, the operational reliability of the brake system is decisively increased by inserting the pressure compensation chamber according to this invention into the pressure medium paths between the pressure compensation reservoir, the auxiliary pressure supply system and the outlet valves and by providing a non-return valve upstream, i.e., inserted into the pressure medium connection path from the reservoir to the chamber. Pressure medium can flow without restriction from the outlet valves into the pressure compensation chamber only when the hydraulic pump of the auxiliary pressure supply system is delivering, i.e., only when the pump, its drive motor and the actuation circuit are intact. With the pump drive motor at a standstill and with the outlet valves leaking or being open, at most, only a limited braking pressure reduction is possible or rather, at most, pressure medium can flow off the wheel brakes only to a limited extent. Thus a closed pressure medium circuit is kept intact so that, even in case of such troubles, a failure of the brake circuits will be prevented and, at least a braking action—an uncontrolled braking action—is assured. Due to the increase in volume in the pressure compensation chamber, there is only an increase in the piston travel and, hence, in the brake pedal travel by a certain amount.

Expediently, the braking pressure control valves of the inventive brake system are associated with outlet valves or outlet paths which hydraulically connect the wheel brakes of the controlled vehicle wheels with the pressure compensation chamber in the braking pressure reduction phase. Thus, in the pressure reduction phase, the pressure medium is directly fed from the wheel brakes into the pressure compensation chamber.

According to a further embodiment of this invention the auxiliary pressure supply system contains at least one hydraulic pump, the suction side of which is connected to the pressure compensation chamber. Thus, the pressure medium flowing off the pressure compensation chamber is directly determined by the capacity and the condition of the hydraulic pump.

A further embodiment of this invention provides that the braking pressure generator has a dual-circuit design and that, for either brake circuit or rather for either pressure medium circuit of the braking pressure generator, the auxiliary pressure supply system has its own hydraulic pump hydraulically separated from the second circuit and communicating with the appertaining chamber of a two-chamber pressure compensation reservoir via separate pressure compensation chambers whereat the outlet valves or outlet paths are connected, which are associated with the respective pressure medium circuit, and via non-return valves, said chamber of a two-chamber pressure compensation reservoir being hydraulically separated from the second circuit. The two hydraulic pumps can be equipped with a common electric-motor drive. In such an embodiment of the brake system the second circuit will remain fully operative in case of a defect in the other circuit, thus continuing to allow a controlled braking operation of the vehicle wheels connected to the intact circuit.

According to a still further embodiment of this invention, the pressure compensation chamber is provided with a piston which, against the force of a return spring, is displaceable by the pressure introduced in the pressure reduction phase, i.e., after the opening of the outlet valves or of the outlet paths. The piston may be provided with a collar designed as a non-return valve via which the pressure compensation reservoir hydraulically communicates with the pressure compensation chamber and which permits pressure medium to flow into the pressure compensation chamber. A pressure compensation chamber equipped with such a piston, inter alia, enables an immediate, though limited pressure reduction or rather pressure medium discharge from the wheel brakes of the controlled wheels in the starting phase of the hydraulic pump.

In another embodiment of this invention a pressure limiting valve lies parallel to the non-return valve connected upstream of the pressure compensation chamber. The pressure limiting valve is adjusted to a value, e.g., of between about 30 to about 60 bars. Even with extremely high braking pressures and with control commencing, there will be a limitation of the hydraulic pressure acting on the pump at first continuing to be at a standstill. This is to protect the hydraulic pump of the auxiliary pressure supply system and to improve the starting behavior of the pump.

A particularly simple anti-skid-controlled brake system according to this invention can be manufactured at little expense. In this system the braking pressure generator is designed as a pedal-operated tandem master cylinder equipped with a vacuum booster connected upstream. The two working chambers of said master cylinder each communicate with the pressure compensation reservoir via a pressure control valve, which keeps up a pedal-force-proportional pressure in the working chambers upon the supply of auxiliary pressure, and with the wheel brakes via the pressure control valves. A separate hydraulic pump each is connected to each of the two outlets of the master cylinder for the supply of auxiliary pressure. Expediently, the braking pressure control valves, via which the working chambers of the master cylinder communicate with the pressure compensation reservoir, are designed so as to ensure that braking pressure control will start only after the master cylinder pistons have been returned by the supplied auxiliary pressure into their pedal-side end positions.

According to this invention, such a brake system with additional traction slip control, includes additional separating valves inserted into the pressure medium paths from the auxiliary pressure supply system to the master cylinder outlets and to the wheel brakes of the non-driven wheels. These additional separating valves can be changed over in the traction slip control phase and prevent the pressure from decreasing or rather prevent the pressure generated in the auxiliary pressure supply system from flowing off via the master cylinder as well as auxiliary pressure from being supplied into the wheel brakes of the non-driven wheels.

BRIEF DESCRIPTION OF THE DRAWING

Further characteristics, advantages, and applications of this invention will become apparent from the following description, taken with reference to the Figures of the accompanying drawing, in which.

DETAILED DESCRIPTION OF PREFERRED EMBODIMENTS

Figure 1:
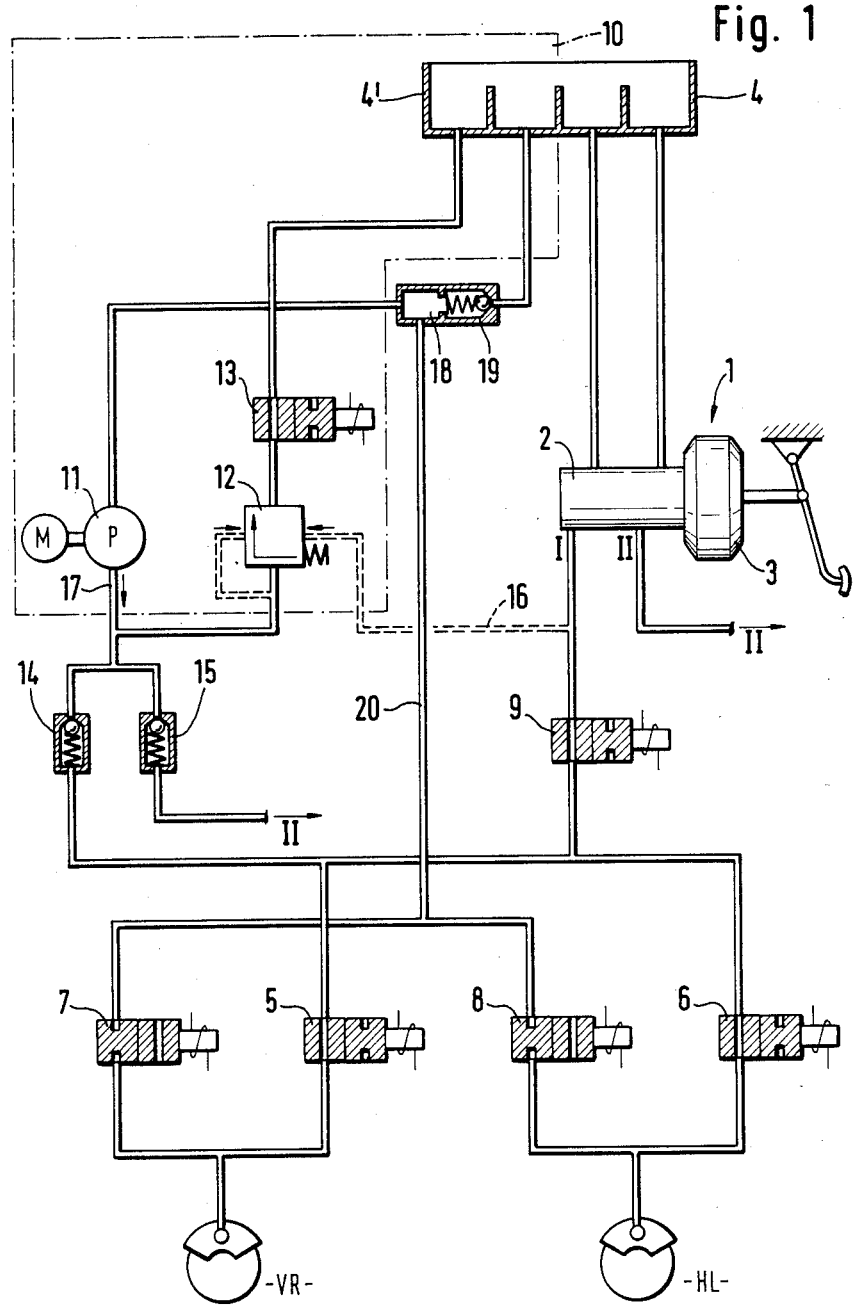
FIG. 1 is a simplified, schematical representation of the main hydraulic components and the hydraulic circuitry of a brake system with anti-skid control and traction-slip control in accordance with this invention.

FIG. 1 illustrates the basic principle of a brake system according to this invention. In this schematic representation, there is provided a braking pressure generator 1 composed of a tandem master cylinder 2 with a brake booster 3 which is connected upstream. The brake booster 3, e.g., may have the design of a vacuum brake booster. As is usual, the braking pressure generator 1 is associated with a pressure compensation reservoir 4 also serving as a pressure medium storage reservoir.

In this system, the wheel brakes of the vehicle wheels of one diagonal are each connected to the two brake circuits I, II. For the sake of simplicity, FIG. 1 only illustrates the hydraulic circuitry of brake circuit I which comprises the right front wheel VR and the left rear wheel HL. Brake circuit II is provided for the other two wheels and is similar to brake circuit I.

Multi-directional valves are provided as braking pressure control valves required for slip control. Each of the controlled wheels is equipped with a normally open inlet valve 5, 6 and a normally closed outlet valve 7, 8. These valve pairs 5, 7 and 6, 8 allow an individual control of the braking pressure at the controlled wheels. Further, a common separating valve 9 is inserted into the pressure medium path from the master cylinder 2 to the two connected wheels VR, HL. The valve 9 is normally open and is needed for traction slip control, only. The inlet valve 5, 6, the outlet valves 7, 8 and the common valve 9 are electromagnetically operated and are associated with electronic control circuitry (not shown).

The brake system according to FIG. 1 is also equipped with an auxiliary pressure supply system 10 which essentially comprises an electric-motor-driven hydraulic pump 11, a braking pressure control valve 12, a normally open, electromagnetically operated valve 13 and a pressure compensation reservoir 4'. The compensation reservoirs 4 and 4' usually are combined into one sole reservoir subdivided into several chambers.

The auxiliary pressure supply system is connected to the two brake circuits I, II via two non-return valves 14 and 15, respectively. Upon actuation of the braking pressure generator 1 and with the hydraulic pump 11 not being switched on, the non-return valves 14, 15 prevent a pressure reduction via the supply system 10. The connection point lies between the inlet valves 5, 6 and the separating valve 9 so as to prevent the braking pressure from being decreased via the master cylinder 2 toward the reservoir 4 when the auxiliary pressure is switched on and the brake is not operated as is the case during traction slip control.

In the anti-skid control phase the auxiliary pressure supply system 10 generates a pressure proportional to the pressure in brake circuit I and, hence, proportional to the braking force exerted on the pedal. To this end, the auxiliary braking pressure control valve 12 is connected to brake circuit I via a pressure control line 16. When brake circuit I is not pressurized the pressure control valve 12 is opened that wide, establishing a communication toward the reservoir 4', so that no auxiliary pressure may come up in the auxiliary pressure supply line 17 even with the hydraulic pump 11 switched on. In the traction slip control phase, however, auxiliary pressure is required even when the braking pressure generator 1 is not operated. Accordingly, the valve 13 is switched into its locking position and closes the pressure medium path toward the reservoir 4'. Now uncontrolled auxiliary pressure can be supplied into the brake circuits I, II via the line 17.

The above-described and similar hydraulic circuitries or valve arrangements are known.

In the traction slip control phase, the inlet valve 5 or 6 leading to the non-driven wheel is closed. It is also necessary to take care that auxiliary pressure or rather braking pressure will reach the driven wheel, only.

The brake system in accordance with this invention provides for the insertion and hydraulic circuity of a pressure compensation chamber 18 with a non-return valve 19 connected upstream. Connected to the pressure compensation chamber 18 are the suction side of the hydraulic pump 11 of the auxiliary pressure supply system 10 and the outputs of the outlet valves 7, via a return line 20. The non-return valve 19 can open only toward the pressure compensation chamber 18. Thus pressure medium can be supplied from the reservoir 4' only when the hydraulic pump 11 is delivering. Further, the delivery of the hydraulic pump 11 must be sufficient to at first reduce the pressure introduced into the chamber 18 via the outlet valves 7 and/or 8 and via the return line 20 in the braking pressure reduction phase.

Because of the insertion of the pressure compensation chamber 18 and its associated non-return valve 19 connected upstream, a closed brake circuit will be maintained in case of trouble in the hydraulic pump 11, in the appertaining drive motor M or in the (non-illustrated) actuation circuit and even in case f changing over of the outlet valves 7 and/or The same applies for the case of jamming or leaking of the outlet valves 7, 8 when, likewise, only a very limited pressure medium volume can reach the pressure compensation chamber 18, yet cannot enter the pressure compensation reservoir 4', as long as the pump 11 is not delivering. The result thereof is that a failure of the brake system or of the brake circuit concerned is reliably prevented in case of defects of the type described. As in such cases at the maximum, a limited pressure medium amount can flow off via the outlet valves 7, 8, a sufficient pressure medium volume is maintained in the master cylinder for an uncontrolled braking operation.

Figure 2:
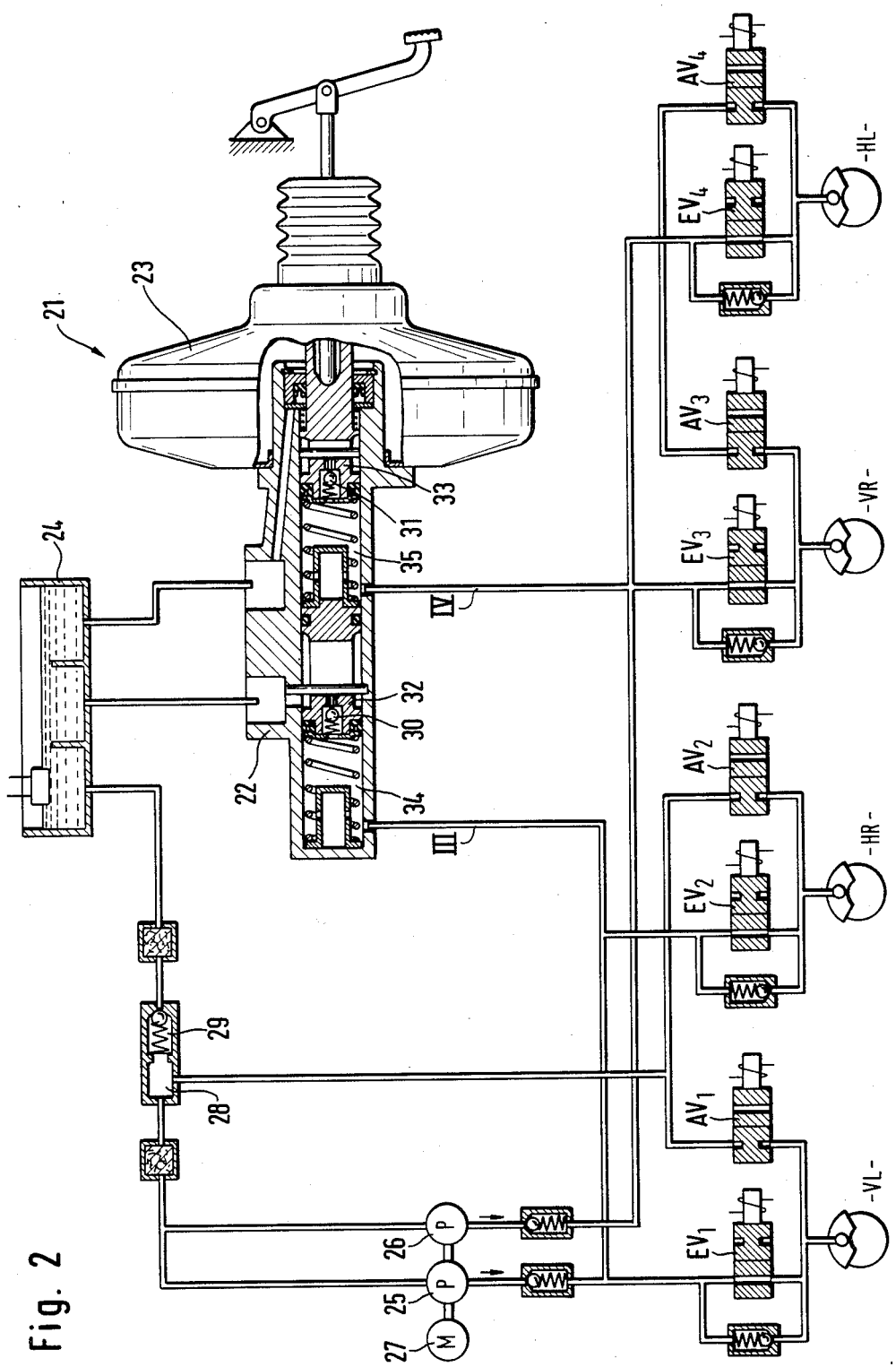
FIG. 2 is an especially simple anti-skid-controlled brake system according to this invention, the mode of representation being similar to that of FIG. 1.

The brake system in the example of an embodiment of this invention illustrated in FIG. 2 is an anti-skid-controlled brake system characterized by a simple design and a small number of valves although the braking pressure can be controlled individually in all four vehicle wheels.

The braking pressure generator 21 of the brake system according to FIG. 2 likewise consists of a tandem master cylinder 22 with a pedal-operated vacuum brake booster 23 connected upstream. The allocation again is diagonal, and thus the wheel brakes VL, HR; VR, HL are connected to the two brake circuits III, IV of the master cylinder 22 via electromagnetically operated inlet/outlet valve pairs $EV_1$, $AV_1$ through $EV_4$. $AV_4$ serving as braking pressure control valves. According to FIG. 2, the auxiliary pressure is generated by means of two hydraulically separated hydraulic pumps 25, 26 driven by a common electric motor 27. Connected to a common pressure medium reservoir 24 are both the two brake circuits of the tandem master cylinder 22 and the two hydraulic pumps 25, 26 via a pressure compensation chamber 28 with a non-return valve 29 connected upstream.

In the embodiment of the brake system according to FIG. 2, central valves 30, 31 designed as braking pressure control valves take over control of the auxiliary pressure—after the pump motor 27 has been switched on by an anti-skid control signal. In the illustrated end position of the two working pistons 32, 33 within the master cylinder 22 said central valves are open so that the working chambers 34, 35 of the master cylinder 22 communicate with the respective chambers in the reservoir 24. In case of normal, i.e., uncontrolled braking operations the central valves are closed by the displacement of the working pistons 32, 33 so that braking pressure can build up in the working chambers 34, 35.

After the auxiliary pressure supply system or rather the hydraulic pumps 25, 26 have been switched on the auxiliary pressure at first returns the pistons 32, 33 into the pedal-side end position and thereupon opens them just so wide as to ensure that a pressure proportional to the pedal force will result in the working chambers 34, 35 and, hence, in the brake circuits III, IV.

The function of the auxiliary pressure control valve 12 of FIG. 1 is thus taken over by said central valves 30, 31.

In the embodiment according to FIG. 2, the outlet valves $AV_1$ through $AV_4$ are connected to the pressure compensation chamber 28. Again, pressure medium can flow off the wheel brakes via the outlet valves $AV_1$ through $AV_4$ only when at least one of the hydraulic pumps 25, 26 is delivering. In the braking pressure reduction phase the outlet valves $AV_1$ through $AV_4$ are changed over temporarily by a signal of the non-illustrated control unit or are changed over by a pulse sequence. For the rest, the explanations made with reference to the embodiment according to FIG. 1 apply to the mode of operation and to the advantages of the inventive pressure compensation chamber and of the non-return valve connected upstream.

Figure 3:
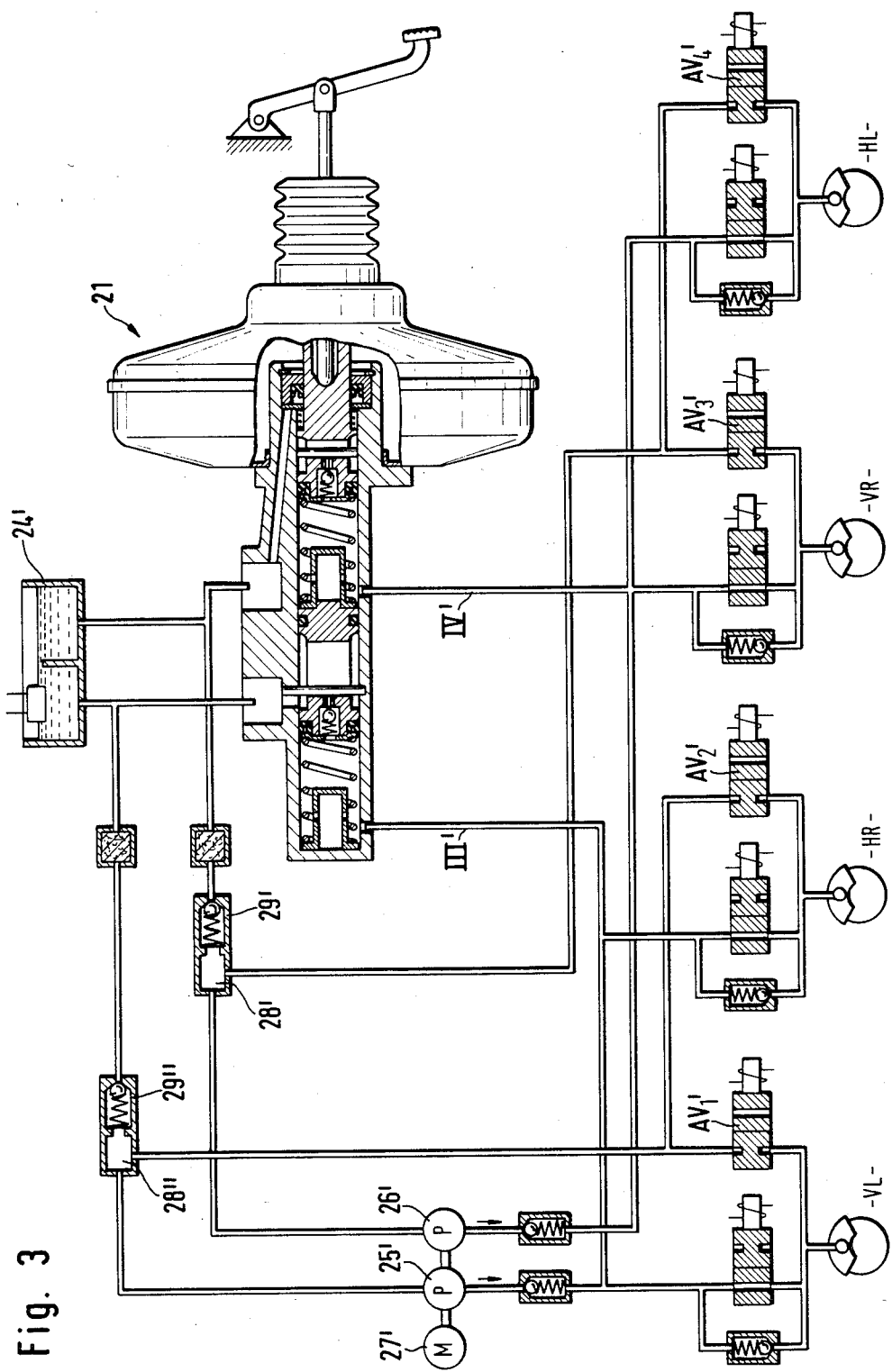
FIG. 3 is a variation of the embodiment of the brake system of FIG. 2, the mode of representation being the same.

The brake system according to FIG. 3 differs from the system according to FIG. 2 only in the hydraulic separation of the two brake circuits III', IV' inclusive of the auxiliary pressure supply system, in particular of the connections of the two hydraulic pumps 25' and 26' via the separate pressure compensation chambers 28', 28'' with the appertaining non-return valves 29', 29''. In this case it is sufficient to subdivide the pressure compensation reservoir 24' into two chambers.

In this embodiment, the operation of the second hydraulic circuit III' or IV' is kept up unrestrictedly in case of failure of either pump 25' or 26' or in case of leaking of an outlet valve.

The expansion of an anti-skid-controlled brake system according to FIG. 2 or FIG. 3 into an anti-skid/traction slip control system can be accomplished merely by inserting separating valves. These separating valves have been described in the embodiment of FIG. 1.

Figure 4A:
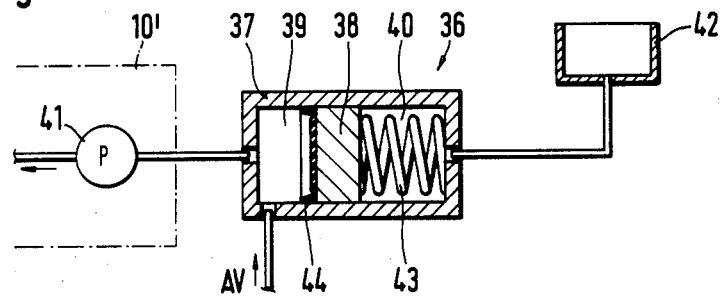
FIGS. 4A, 4B and 4C each show an embodiment of the inventive brake system's pressure compensation chamber and non-return valve connected upstream.
Figure 4B:
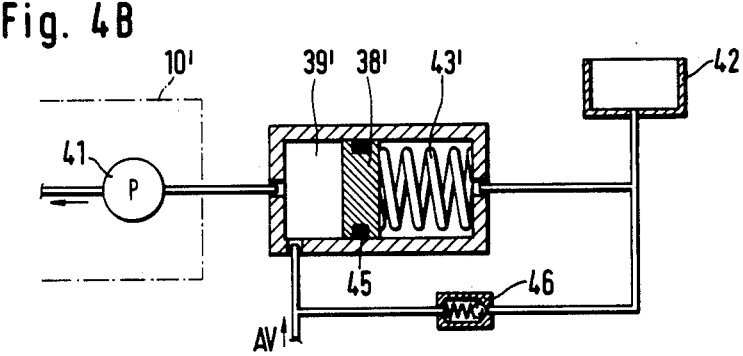

FIGS. 4A and 4B show different embodiments of the pressure compensation chamber which is essential for this invention and which is combined with the appertaining non-return valve connected upstream.

According to FIG. 4A, the pressure compensation chamber and the non-return valve connected upstream are combined into one component 36 comprising a piston 38 guided within a cylinder 37. The front faces of said piston 38 form and cooperate with chambers 39, 40. The chamber 39 communicates with the suction side of the hydraulic pump 41 of the auxiliary pressure supply system 10' while chamber 40, on the opposite side, is connected to the pressure compensation reservoir 42 of a brake system, e.g., to the reservoir 24 or 24' of the system according to FIG. 2 or FIG. 3. The pressure medium return line also leads to chamber 39. Via said pressure medium return line it is possible to tap pressure medium from the wheel brakes in the braking pressure reduction phase, i.e., after the outlet valves AV have been changed over.

By means of the pressure supplied into the chamber 39 via the outlet valves AV the piston 38 is displaceable against the force of a return spring 43.

In the embodiment according to FIG. 4A, the non-return valve connected upstream is realized by annular collar 44 arranged at the circumference of the piston 38. Via said collar, pressure medium from the pressure compensation reservoir, 42 can enter the chamber 39 via the chamber 40. Pressure medium flow in the opposite direction is prevented.

If now, at the beginning of a control phase, an outlet valve AV is opened and the pump 41 is set into operation, the piston 38 will be displaced against the force of the return spring 43 during the starting phase of the pump 41. Even in the starting phase of the pump 41, a faster pressure reduction will be achieved in the wheel brake of the wheel tending to lock. As soon as the pump 41 has reached a sufficient delivery the piston 38 will again be returned into its initial position. With full delivery of the pump 41 and/or with the outlet valve AV closing, pressure medium will flow from the reservoir 42 to the suction side 41 via the collar 44.

In the embodiment according to FIG. 4B, instead of a collar 44 as per FIG. 4A, a separate non-return valve 46 is used in the pressure medium path from the pressure compensation reservoir 42 to the chamber 39' communicating with the suction side of the hydraulic pump 41 of the auxiliary pressure supply system 10'. In this case the piston 38' is secured against leaking of pressure medium by means of a sealing ring 45. In the embodiments according to FIGS. 4A and 4B there are no differences in principle in the mode of operation of the pressure compensation chamber with the non-return valve connected upstream.

Figure 4C:
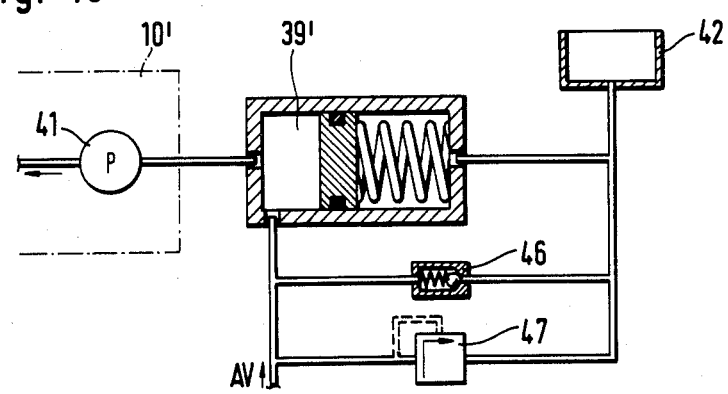

As illustrated by FIG. 4C, according to this invention, it is further possible to connect a pressure limiting valve 47 in parallel with the non-return valve 46 connected upstream. The pressure limiting valve 47 limits the pressure, which—upon the opening of the outlet valves AV—can be supplied into the pressure compensation chamber 39' to a predetermined maximum value. This serves to protect the hydraulic pump 41 or the hydraulic pumps of the auxiliary pressure supply system 10' and to facilitate the starting behavior of said pumps. The pressure limiting valve 47 can be adjusted, e.g., to a maximum pressure of 30 bars.

What is claimed is:

1. A hydraulic brake system with anti-skid control and/or with traction slip control, said brake system having a braking pressure generator and pressure for tapping pressure medium from the wheel brakes of the controlled vehicle wheels in a braking pressure reduction phase during slip control, an auxiliary pressure supply system connected to the pressure compensation reservoir, said auxiliary supply system being switched on during traction slip or anti-skid control for supplying pressure medium into the wheel brakes of the controlled vehicle wheels, a pressure compensation chamber and a non-return valve located in a pressure medium path connecting said pressure compensation reservoir to said auxiliary supply system, said non-return valve located between said pressure compensation chamber and said pressure compensation reservoir and opening toward the pressure compensation chamber, said pressure compensation chamber communicating with said braking pressure control valve means so that in case of braking pressure reduction, the pressure medium flowing off the wheel brakes is introduced into the pressure compensation chamber, the auxiliary pressure supply system including at least one hydraulic pump having a suction of which is connected to the pressure compensation chamber.

2. A brake system as claimed in claim 1 wherein the braking pressure control valve means include outlet valves for hydraulically connecting the wheel brakes of the controlled vehicle wheels with the pressure compensation chamber in the braking pressure reduction phase.

3. A brake system as claimed in claim 2 wherein the braking pressure generator has dual-circuit connection means for connecting a separate chamber of the pressure compensation reservoir to each of two pressure medium circuits, the auxiliary pressure supply system having a hydraulic pump for each circuit, said circuits being hydraulically separated, each of said pumps communicating with one of the separate chambers of the two-chamber pressure compensation reservoir via a separate pressure compensation chamber, each pressure medium circuit having braking pressure control valve means, and one said non-return valve associated therewith.

4. A brake system as claimed in claim 3 wherein the two hydraulic pumps are equipped with a common electric-motor drive.

5. A brake system as claimed in claim 1 wherein the pressure compensation chamber includes a piston and a return spring, said piston being displaceable by the pressure introduced in the pressure reduction phase, after the opening of the braking pressure control valve means.

6. A brake system as claimed in claim 5 wherein the piston is provided with an annular collar operating as said non-return valve.

7. A brake system as claimed in claim 1 wherein a pressure limiting valve is hydraulically connected in parallel with the non-return valve between the pressure compensation reservoir and the pressure compensation chamber.

8. An anti-skid-controlled brake system as claimed in claim 1 wherein the braking pressure generator is as a pedal-operated tandem master cylinder with a vacuum brake booster connected upstream thereof, the two working chambers of the tandem master cylinder each communicating with the pressure compensation reservoir via a pressure control valve which keeps up a pedal-force-proportional pressure in the working chambers upon the supply of auxiliary pressure, and also communicating with the wheel brakes via the pressure control valve means, and two of said hydraulic pumps, one pump being connected to each outlet of said tandem master cylinder.

9. A brake system as claimed in claim 8 wherein the pressure control valves via which the working chambers of the tandem master cylinder communicate with the pressure compensation reservoir are operating only after the working pistons of the master cylinder have been returned into a pedal side end-position of said master cylinder when auxiliary pressure is supplied by said pumps.

10. A brake system as claimed in claim 9 wherein separating valves are inserted into the pressure medium paths from the auxiliary pressure supply system to the master cylinder outlets and to the wheel brakes of the non-driven wheels, the separating valves being switched in the traction slip control phase to prevent the pressure from decreasing via the tandem master cylinder as well as the auxiliary pressure from being supplied into the wheel brakes of the non-driven wheels.

* * * * *